US011589495B2

(12) United States Patent
Glovier (10) Patent No.: US 11,589,495 B2
(45) Date of Patent: Feb. 28, 2023

(54) SYSTEM AND METHOD FOR DETERMINING MATERIAL ACCUMULATION RELATIVE TO GROUND ENGAGING TOOLS OF AN AGRICULTURAL IMPLEMENT

(71) Applicant: CNH Industrial America LLC, New Holland, PA (US)

(72) Inventor: Scott Glovier, Pittsburgh, PA (US)

(73) Assignee: CNH Industrial America LLC, New, PA (US)

( * ) Notice: Subject to any disclaimer, the term of this patent is extended or adjusted under 35 U.S.C. 154(b) by 521 days.

(21) Appl. No.: 16/539,495

(22) Filed: Aug. 13, 2019

(65) Prior Publication Data
US 2021/0045281 A1 Feb. 18, 2021

(51) Int. Cl.
| | |
|---|---|
| *A01B 76/00* | (2006.01) |
| *A01B 15/00* | (2006.01) |
| *A01B 5/04* | (2006.01) |
| *A01B 63/24* | (2006.01) |
| *G01N 27/22* | (2006.01) |
| *A01B 49/02* | (2006.01) |

(52) U.S. Cl.
CPC ............... *A01B 76/00* (2013.01); *A01B 5/04* (2013.01); *A01B 15/00* (2013.01); *A01B 63/24* (2013.01); *G01N 27/228* (2013.01); *A01B 49/027* (2013.01)

(58) Field of Classification Search
CPC ........... A01B 76/00; A01B 5/04; A01B 15/00; A01B 63/24; A01B 49/027; G01N 27/228
See application file for complete search history.

(56) References Cited

U.S. PATENT DOCUMENTS 8,408,149 B2 4/2013 Rylander
8,598,829 B2 12/2013 Landry et al.
(Continued)

FOREIGN PATENT DOCUMENTS

WO WO-2016077421 A1 * 5/2016 ............. A01B 15/18

OTHER PUBLICATIONS

F. Kumhála et al., "Field Tests of a Capacitive Throughput Sensor Installed on a Potato Conveyor Digger," Czech University of Life Sciences Prague, Faculty of Engineering, Prague, Czech Republic, Scientia Agriculturae Bohemica, 42, 2011 (4):L 180-187.
(Continued)

*Primary Examiner* — Tara Mayo-Pinnock
(74) *Attorney, Agent, or Firm* — Rebecca Henkel; Rickard DeMille (57) ABSTRACT

A system for determining material accumulation relative to ground engaging tools of an agricultural implement may include a frame member, and first and second ground engaging tools coupled to the frame member. The first and second ground engaging tools are configured to engage soil within a field as the agricultural implement is moved across the field. The first and second ground engaging tools are electrically isolated from each other. The system may further include a power source configured to apply a voltage across the first and second ground engaging tools, a sensor configured to measure a capacitance across the first and second ground engaging tools, and a controller communicatively coupled to the sensor. The controller may be configured to determine a presence of material accumulation between the first and second ground engaging tools based at least in part on the measured capacitance.

20 Claims, 8 Drawing Sheets

(56) References Cited

U.S. PATENT DOCUMENTS

| | | |
|---|---|---|
| 9,485,900 B2 | 11/2016 | Connell et al. |
| 9,629,304 B2 | 4/2017 | Zielke |
| 10,149,422 B2 | 12/2018 | Tippery et al. |
| 2017/0067869 A1 | 3/2017 | Lund et al. |
| 2018/0352718 A1 | 12/2018 | Kovach et al. |
| 2019/0047009 A1* | 2/2019 | Barker et al. ......... B05B 12/084 |
| 2019/0166753 A1 | 6/2019 | Hoffman et al. |
| 2019/0208698 A1 | 7/2019 | Maxton et al. |

OTHER PUBLICATIONS

F. Kumhála et al., "Capacitive Throughput Sensor for Sugar Beets and Potatoes," Czech Univerisity of Life Sciences Prague, Faculty of Engineering, Kamýcká 129, 165, 21 Prague 6 Suchdol, Czech Republic, Biosystems Engineering 102 (2009) 36-43.

Jakub Lev, "Influence of Conveyor Pockets on Material Throughput Measurement by Capacitive Sensor," Czech University Life Sciences Prague, Department of Agriculture Machines, Engineering for Rural Development Jelgava, 29.—May 30, 2014, pp. 324-328.

Jakub Lev, "Sensitivity of Capacitive Throughput Sensor to the Change of Material Relative Permittivity," Czech University of Life Sciences Prague, Faculty of Engineering, Department of Physics, Kamýcká 129, 165, 21 Prague 6 Suchdol, Czech Republic, Agronomy Research 13(1), 124-129, 2015.

The International Search Report and Written Opinion Corresponding to Application No. PCT/US2020/045714 dated Nov. 23, 2020 (11 pages).

\* cited by examiner

SYSTEM AND METHOD FOR DETERMINING MATERIAL ACCUMULATION RELATIVE TO GROUND ENGAGING TOOLS OF AN AGRICULTURAL IMPLEMENT

FIELD OF THE INVENTION

The present disclosure relates generally to plugging or material accumulation and, more particularly, to systems and methods for determining material accumulation relative to ground engaging tools of an agricultural implement.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include one or more ground engaging tools configured to engage the soil as the implement is moved across the field. For example, in certain configurations, the implement may include one or more harrow disks, leveling disks, rolling baskets, shanks, tines, and/or the like. Such ground engaging tool(s) loosen and/or otherwise agitate the soil to prepare the field for subsequent planting operations.

During tillage operations, field materials, such as residue, soil, rocks, and/or the like, may become trapped or otherwise accumulate between adjacent ground engaging tools. Such accumulations of field materials may inhibit the operation of the ground engaging tools in a manner that prevents the tools from providing adequate tillage to the field. In such instances, it is necessary for the operator to take certain corrective actions to remove the material accumulation. However, it may be difficult for the tillage implement operator to determine when material accumulation occurs between the ground engaging tools.

Accordingly, a system and related method for determining material accumulation relative to ground engaging tools of an agricultural implement would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for determining material accumulation relative to ground engaging tools of an agricultural implement. The system includes a frame member extending along a first direction and first and second ground engaging tools coupled to the frame member. The first and second ground engaging tools are configured to engage soil within a field as the agricultural implement is moved across the field. The first and second ground engaging tools are electrically isolated from each other. The system further includes a power source configured to apply a voltage across the first and second ground engaging tools, a sensor configured to measure a capacitance across the first and second ground engaging tools, and a controller communicatively coupled to the sensor. The controller is configured to determine a presence of material accumulation between the first and second ground engaging tools based at least in part on the measured capacitance.

In another aspect, the present subject matter is directed to an agricultural implement. The agricultural implement includes a frame member, and a plurality of disks supported on the frame member. The first and second disks of the plurality of disks are electrically isolated from each other. The agricultural implement further includes a power source configured to apply a voltage across the first and second disks of the plurality of disks, a sensor configured to measure a capacitance across the first and second disks of the plurality of disks, and a controller communicatively coupled to the sensor. The controller is configured to determine a presence of material accumulation between the first and second disks of the plurality of disks based at least in part on the measured capacitance.

In a further aspect, the present subject matter is directed to a method for determining material accumulation relative to ground engaging tools of an agricultural implement. The agricultural includes a frame member and first and second ground engaging tools coupled to the frame member. The method includes applying a voltage across the first and second ground engaging tools, with the first and second ground engaging tools being electrically isolated from each other. The method further includes receiving, with a computing device, capacitance data associated with a capacitance across the first and second ground engaging tools. Additionally, the method includes analyzing, with the computing device, the capacitance data to determine a presence of material accumulation between the first and second ground engaging tools.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for determining material accumulation relative to adjacent ground engaging tools of an agricultural implement. Specifically, in several embodiments, a controller of the disclosed system may be configured to receive data from one or more sensors as the implement is being moved across a field. The sensor(s) may measure a capacitance or a parameter indicative of capacitance across a pair of adjacent ground engaging tools (e.g., disks, etc.). The pair of adjacent ground engaging tools may generally be electrically isolated from each other such that, when a voltage is applied to the pair of ground engaging tools, an electric field is generated between the ground engaging tools (e.g., similar to a parallel-plate capacitor). In general, the capacitance between the pair of ground engaging tools increases as more field material accumulates between the ground engaging tools. As such, the measured capacitance across the pair of ground engaging tools may be compared to at least one capacitance threshold to determine when the ground engaging tools have become plugged with field materials. For example, in several embodiments, the capacitance threshold(s) may correspond to the capacitance(s) across the pair of ground engaging tools when only air is between the pair of ground engaging tools, when only field materials are between the pair of ground engaging tools, and/or when a particular ratio of field materials and air is between the pair of ground engaging tools. The capacitance threshold(s) may be determined at least in part on the moisture content and dielectric strength of the field materials within the field, as capacitance increases with higher moisture contents and with higher dielectric strengths. Once it is determined that the ground engaging tools have become plugged, the controller may perform one or more control actions. For example, the controller may be configured to indicate the plugging of the monitored ground engaging tools (e.g., via a user interface) to fix operator and/or adjust the operation of the implement, such as by increasing or decreasing the downforce on the ground engaging tools and/or slowing down or stopping the implement.

Figure 1:
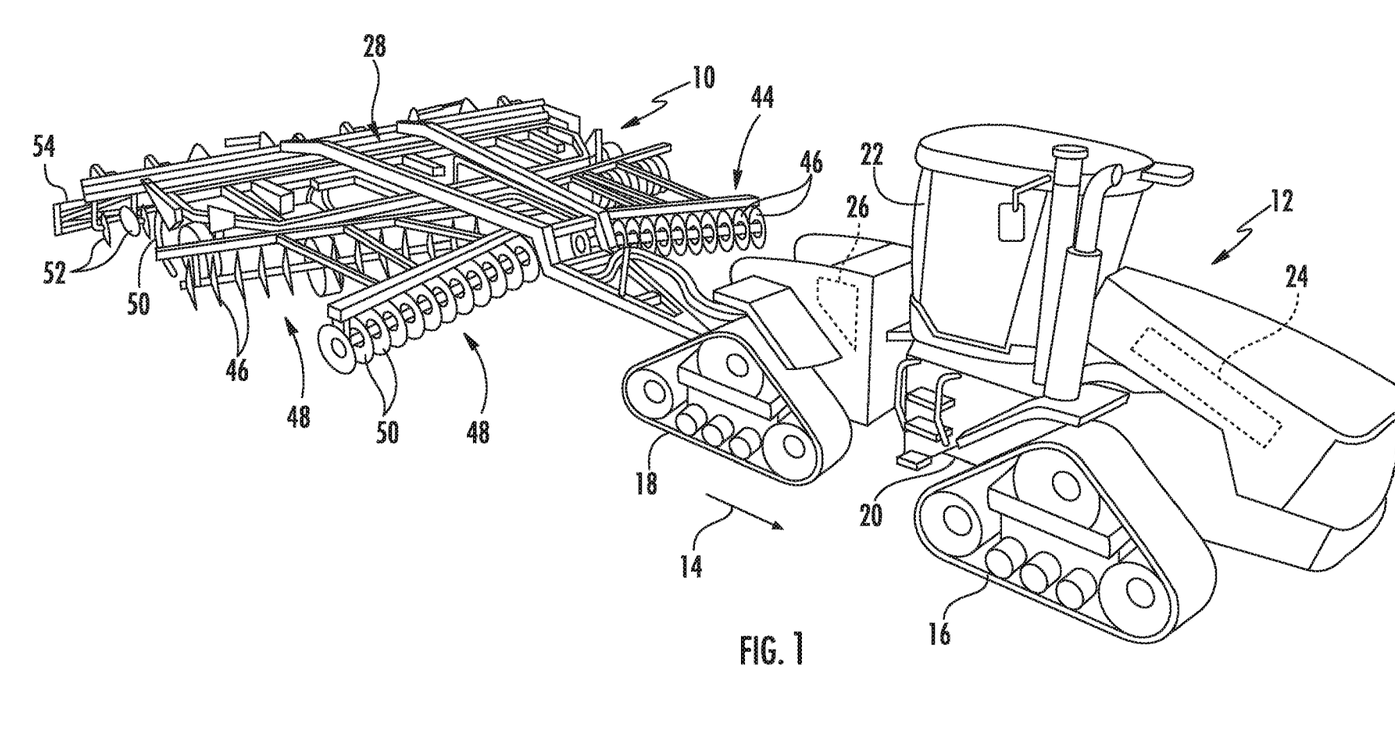
FIG. 1 illustrates a perspective view of one embodiment of an agricultural implement coupled to a work vehicle in accordance with aspects of the present subject matter.
Figure 2:
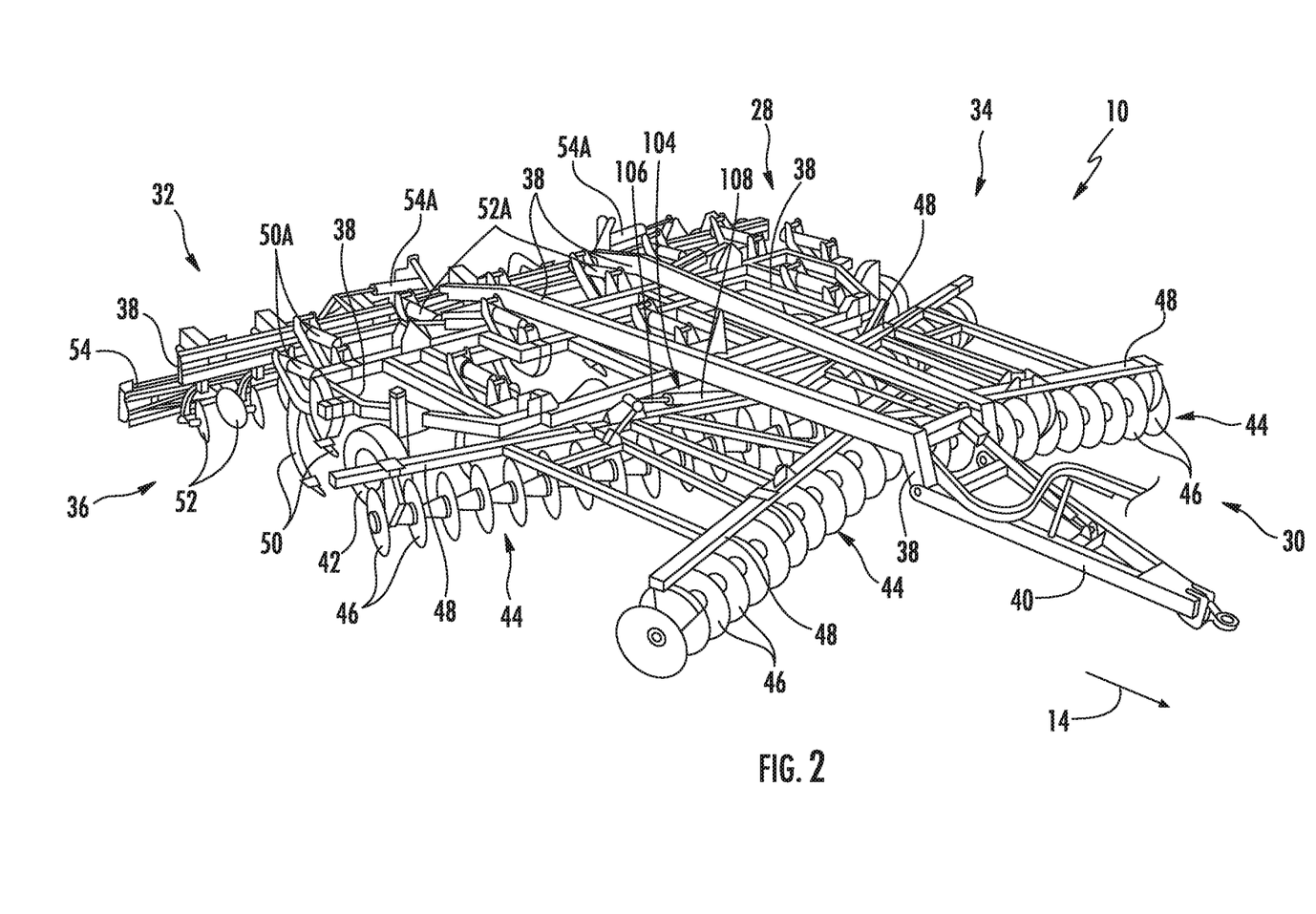
FIG. 2 illustrates another perspective view of the agricultural implement shown in FIG. 1 in accordance with aspects of the present subject matter, particularly illustrating various ground engaging tools and/or assemblies of the implement.

Referring now to the drawings, FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16 (only one of which is shown), a pair of rear track assemblies 18 (only one of which is shown), and a frame or chassis 20 coupled to and supported by the track assemblies 16, 18. An operator's cab 22 may be supported by a portion of the chassis 20 and may house various input devices (e.g., a user interface 260 shown in FIG. 7) for permitting an operator to control the operation of one or more components of the work vehicle 12 and/or one or more components of the implement 10. Additionally, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown in FIGS. 1 and 2, the implement 10 may include a frame 28. More specifically, the frame 28 may extend longitudinally between a forward end 30 and an aft end 32. The frame 28 may also extend laterally between a first side 34 and a second side 36. In this respect, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (one is shown) may be coupled to the frame 28 to facilitate towing the implement 10 in the direction of travel 14.

In several embodiments, the frame 28 may be configured to support one or more gangs or sets 44 of disk blades 46. Each disk blade 46 may, in turn, be configured to penetrate into or otherwise engage the soil as the implement 10 is being pulled through the field. In this regard, the various disk gangs 44 may be oriented at an angle relative to the direction of travel 14 to promote more effective tilling of the soil. In the embodiment shown in FIGS. 1 and 2, the implement 10 includes four disk gangs 44 supported on the frame 28 adjacent to its forward end 30. However, it should be appreciated that, in alternative embodiments, the implement 10 may include any other suitable number of disk gangs 44, such as more or fewer than four disk gangs 44. Furthermore, in one embodiment, the disk gangs 44 may be mounted to the frame 28 at any other suitable location, such as adjacent to its aft end 32.

Moreover, in several embodiments, the implement 10 may include a plurality of disk gang actuators 104 (FIG. 2), with each actuator 104 being configured to move or otherwise adjust the orientation or position of one of the disk gangs 44 relative to the implement frame 28. For example, as shown in the illustrated embodiment, a first end of each actuator 104 (e.g., a rod 106 of the actuator 104) may be coupled to a support arm 48 of the corresponding disk gang 44, while a second end of each actuator 104 (e.g., the cylinder 108 of the actuator 104) may be coupled to the frame 28. The rod 106 of each actuator 104 may be configured to extend and/or retract relative to the corresponding cylinder 108 to adjust the angle of the corresponding disk gang 44 relative to a lateral centerline (not shown) of the frame 28 and/or the penetration depth of the associated disk blades 46. In the illustrated embodiment, each actuator 104 corresponds to a fluid-driven actuator, such as a hydraulic or pneumatic cylinder. However, it should be appreciated that each actuator 104 may correspond to any other suitable type of actuator, such as an electric linear actuator.

Additionally, as shown, in one embodiment, the implement frame 28 may be configured to support other ground engaging tools. For instance, in the illustrated embodiment, the frame 28 is configured to support a plurality of shanks 50 or tines (not shown) configured to rip or otherwise till the soil as the implement 10 is towed across the field. Furthermore, in the illustrated embodiment, the frame 28 is also configured to support a plurality of leveling blades or disks 52 and rolling (or crumbler) basket assemblies 54. The implement 10 may further include shank frame actuator(s) 50A, leveling disk actuator(s) 52A, and/or basket assembly actuator(s) 54A configured to move or otherwise adjust the orientation or position of the shanks 50, leveling disks 52, and the basket assemblies 54, respectively, relative to the implement frame 28. It should be appreciated that, in other embodiments, any other suitable ground-engaging tools may be coupled to and supported by the implement frame 28, such as a plurality closing disks.

It should also be appreciated that the configuration of the implement 10 and work vehicle 12 described above are provided only to place the present subject matter in an exemplary field of use. Thus, it should be appreciated that the present subject matter may be readily adaptable to any manner of implement or work vehicle configurations.

Figure 3:
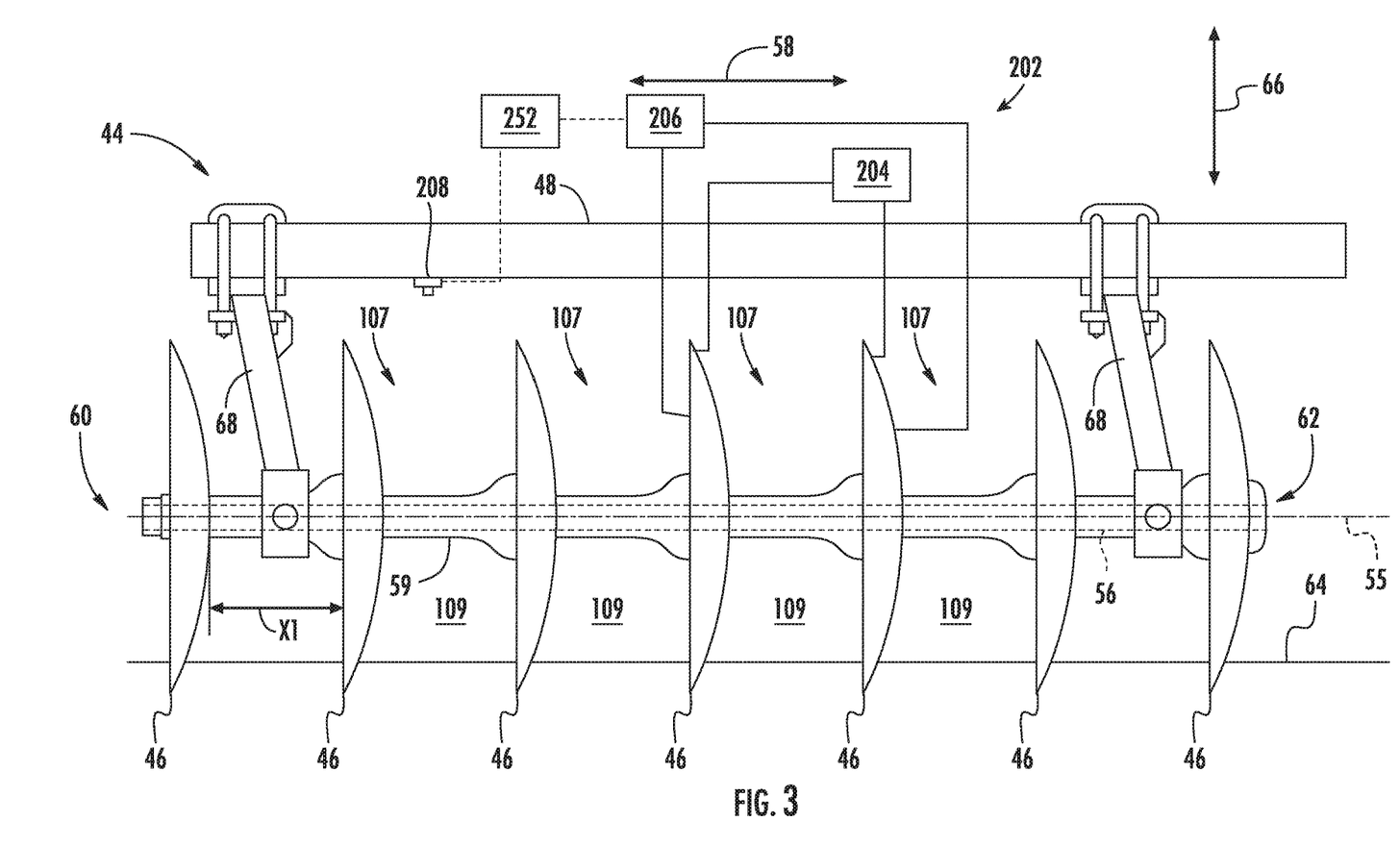
FIG. 3 illustrates a front view of one embodiment of a ground engaging assembly of an agricultural implement in accordance with aspects of the present subject matter, particularly illustrating one embodiment of a sensing assembly suitable for use in determining material accumulation relative to the ground engaging assembly.
Figure 4:
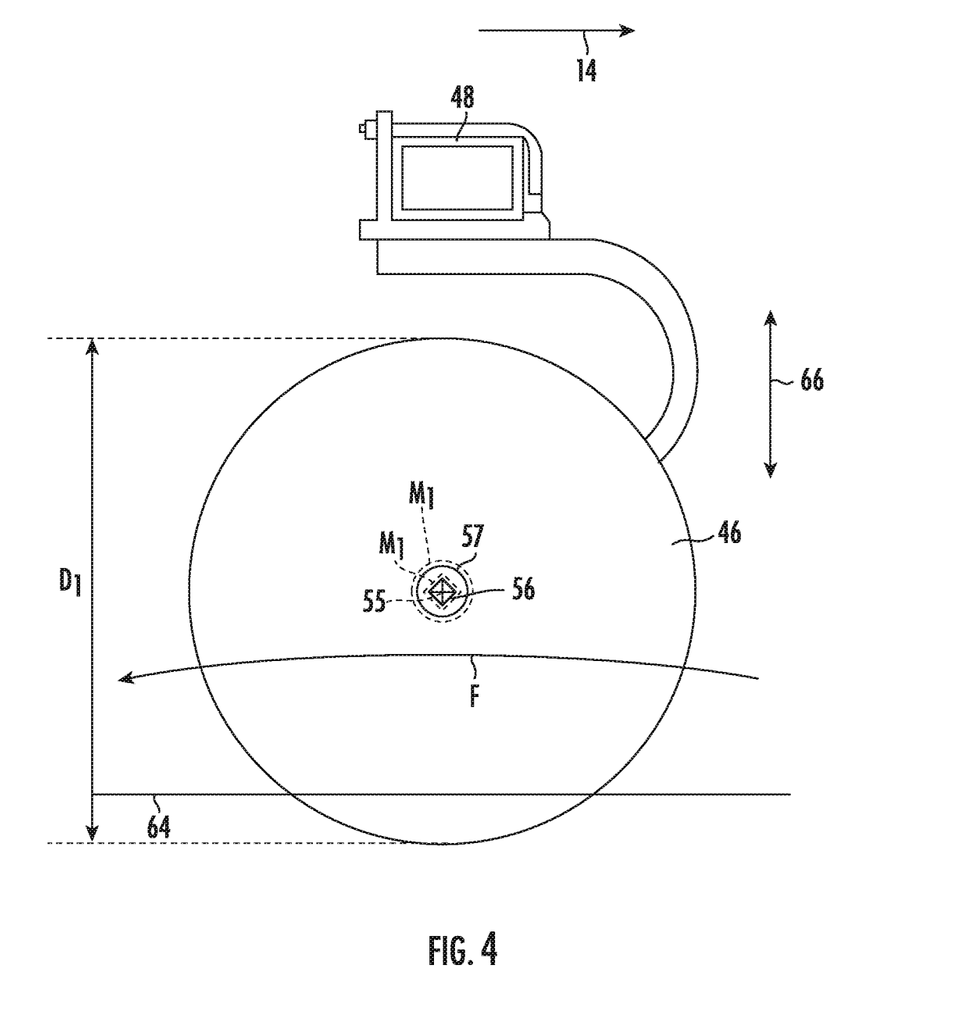
FIG. 4 illustrates a side view of the ground engaging assembly shown in FIG. 3 in accordance with aspects of the present subject matter.

Referring now to FIGS. 3 and 4, exemplary views of a ground engaging assembly (e.g., one of the disk gangs 44 shown in FIGS. 1 and 2) are illustrated in accordance with aspects of the present subject matter. More particularly, FIG. 3 illustrates a front view of one of the disk gangs 44 described above with reference to FIGS. 1 and 2 having components of a sensing assembly installed relative thereto. Additionally, FIG. 4 illustrates a side view of the disk gang 44 shown in FIG. 3.

As shown in FIG. 3, the disk gang 44 may include a disk gang shaft (e.g., as indicated with dashed lines 56) that extends along an axial direction of the disk gang 44 (e.g., as indicated by arrow 58) between a first end 60 and a second end 62. The disk gang shaft 56 may be positioned below the support arm 48 of the disk gang 44 along a vertical direction (e.g., as indicated by arrow 66) of the implement 10 and supported relative to the support arm 48 by one or more hangers 68. However, in alternative embodiments, the disk gang shaft 56 may have any other suitable orientation. Each disk blade 46 may be rotatably coupled or keyed to the disk gang shaft 56 by a bearing 57 (FIG. 4). However, in some embodiments, the disk blades 46 may be directly coupled to the disk gang shaft 56. The disk gang shaft 56 defines a rotational axis (e.g., as indicated by dashed line 55) about which the coupled disk blades 46 rotate. Each disk blade 46 may be spaced apart from an adjacent disk blade 46 in the axial direction 58 via spools 59 by a distance X1. An open space 107 is thus defined between each pair of adjacent disk blades 46 in the axial direction 58. Additionally, each disk blade 46 has the same diameter D1 (FIG. 4).

As the implement 10 is moved across a field, the disk blades 46 may be configured to penetrate the soil surface (e.g., as indicated by line 64) of the field and rotate about the rotational axis relative to the soil within the field such that field materials flow through the open spaces 107. It should be appreciated that during normal, non-plugged operation of the disk gang 44, substantially all of the field materials being processed by the disk gang 44 flow through the open spaces 107, particularly through portion(s) of open spaces 107 defined below the rotational axis 55 (i.e., through lower flow zone(s) 109), with only an occasional piece of residue, dirt clod, rock, and/or the like flowing above the disk gang shaft 56. For example, as shown in FIG. 4, field materials F flow below the rotational axis 55, within the flow zone 109, during normal operation of the disk gang 44.

In certain instances, however, a plugging condition may occur in which field materials accumulate within the flow zone(s) 109. For example, when the soil in the field has high moisture content, the soil may stick or adhere to the disk blades 46 such that the soil accumulates within the associated flow zone(s) 109. Moreover, a large chunk of residue or a rock may become lodged between a pair of adjacent disk blades 46 in a manner that inhibits the flow of field materials through the associated flow zone(s) 109, thereby causing additional field materials to accumulate therein. As such, the disk blades 46 may become plugged and not perform as intended.

In accordance with aspects of the present subject matter, a sensing assembly 202 may be associated with the disk gang 44 for detecting changes in capacitance across the open spaces 107, which may be indicative of changes in the amount of material accumulation within the flow zones 109. In several embodiments, the sensing assembly 202 may include a power source 204 configured to supply a voltage across a pair of adjacent disk blades 46. For instance, the power source 204 may be configured as a battery, with a positive terminal connected to one of the pair of disk blades 46 and a negative terminal connected to the other of the pair of disk blades 46. However, it should be appreciated that the power source 204 may be configured as any other suitable device for supplying a voltage across the pair of adjacent disk blades 46.

The disk blades 46 are electrically isolated from each other such that the pair of adjacent disk blades 46 acts as a parallel-plate capacitor when the voltage is supplied across the disk blades 46. In some embodiments, the adjacent disk blades 46 may be electrically isolated from each other by forming, coating, or otherwise processing at least one of the components coupled between the adjacent disk blades 46 with non-conductive material. For example, at least one of the disk gang shaft 56, the bearings 57, and/or the spools 59 may be non-conductive. Additionally, or alternatively, in some embodiments, the adjacent disk blades 46 may be electrically isolated from each other by inserting a non-conductive material M1 between at least two of the components coupled between the disk blades 46. For instance, the non-conductive material M1 may be positioned between the disk gang shaft 56 and the bearings 57, and/or between the disk blades 46 and the bearings 57.

The sensing assembly 202 may further include a capacitance sensor 206 configured to detect the capacitance, or a parameter indicative of the capacitance, across the pair of adjacent disk blades 46. The capacitance sensor 206 may be configured as any suitable sensing device for measuring a parameter indicative of capacitance. For instance, in one embodiment, the capacitance sensor 206 corresponds to a capacitance meter such that the capacitance sensor 206 may directly measure the capacitance across the pair of adjacent disk blades 46. Alternatively, the capacitance sensor 206 may measure any other parameter indicative of capacitance, such as voltage, and/or the like. The capacitance sensor 206 may be configured to transmit data indicative of the capacitance between the adjacent disk blades 46 to a controller 252 for subsequent processing and analysis. For instance, the capacitance across the adjacent disk blades 46 may be monitored to determine a plugging condition of the disk blades 46.

Additionally, in some embodiments, one or more soil moisture sensors 208 may be provided in operative association with the implement 10. Generally, as indicated above, capacitance of the field materials depends on the moisture content of the field materials. For instance, field materials between the adjacent disk blades 46 with higher moisture contents will cause a higher capacitance across the adjacent disk blades 46 than the same type and amount of field materials with lower moisture contents. As such, the soil moisture sensor(s) 208 may generally be configured to detect a parameter associated with the moisture content of the soil within the field across which the implement 10 is being moved. For example, in one embodiment, the soil moisture sensor(s) 208 may be configured as an optical sensor(s) configured to detect one or more characteristics of light reflected by the soil, with such characteristics generally being indicative of the soil moisture content. However, it should be appreciated that, in alternative embodiments, the soil moisture sensor(s) 208 may be configured as any other suitable device for sensing or detecting the moisture content of the soil, such as a contact resistance sensor or any other contact-based sensing device configured to engage or contact the soil as the implement 10 is towed across the field. The moisture sensor(s) 208 may be configured to transmit the moisture content data to the controller 252 for subsequent processing and/or analysis. For example, the moisture content of the field materials or soil within the field may be used to determine one or more capacitance thresholds above which it can be inferred that plugging is likely occurring, as will be described in greater detail below.

Figure 5:
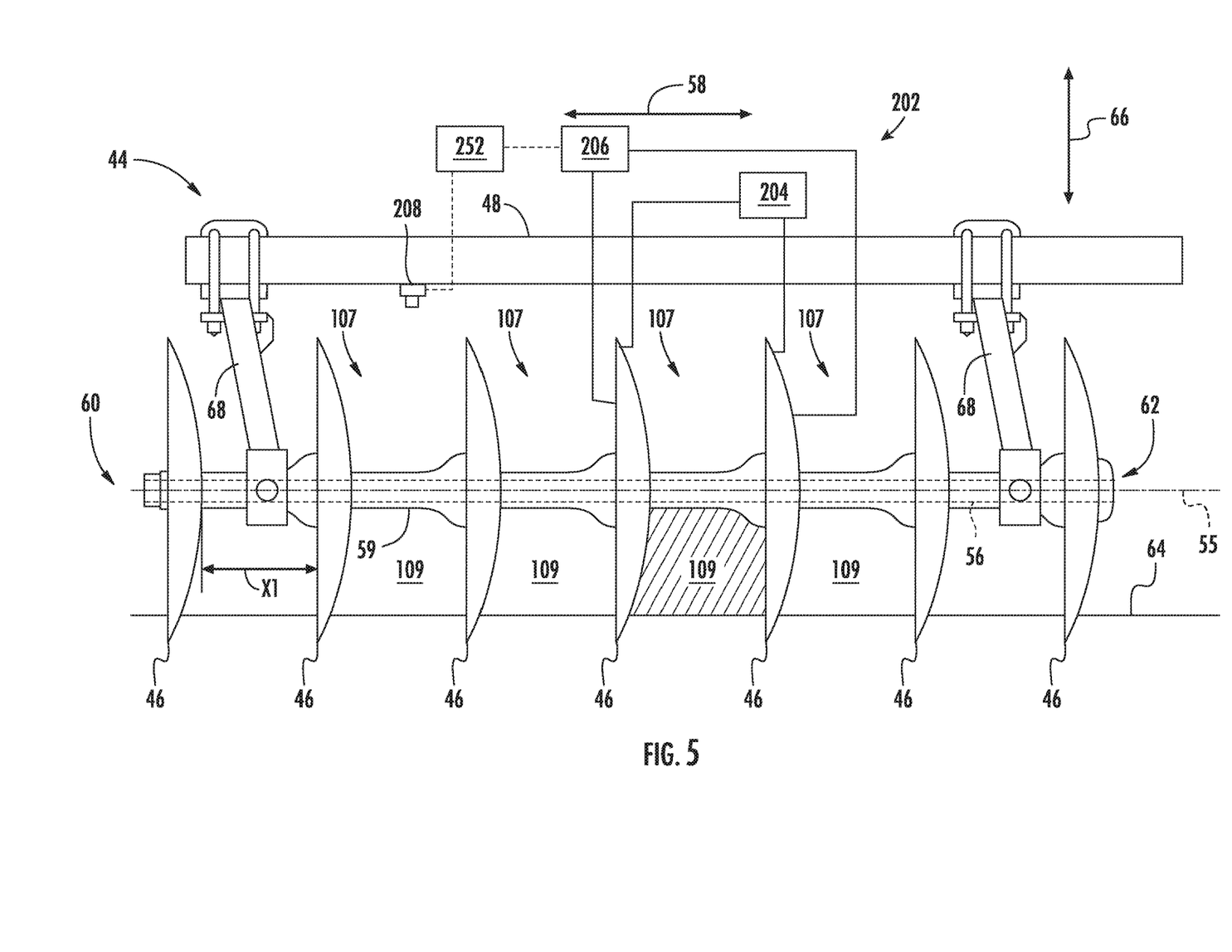
FIG. 5 illustrates another front view of the ground engaging assembly and sensing assembly shown in FIG. 3 in accordance with aspects of the present subject matter, particularly illustrating the presence of material accumulation relative to the ground engaging assembly.

Referring now to FIG. 5, an exemplary view of a ground engaging assembly (e.g., the disk gang 44 shown in FIG. 3) is illustrated in accordance with aspects of the present subject matter. More particularly, FIG. 5 illustrates a front view of the disk gang 44 and sensing assembly 202 described above with reference to FIGS. 3 and 4 while the disk gang 44 is experiencing a plugging condition where excessive material accumulation 111 has built up within one of the flow zones 109. The sensing assembly 202 may be used to monitor the capacitance between or across the adjacent disk blades 46, with the monitored capacitance being indicative of the amount of material accumulation 111 between the disk blades 46. In general, the more material accumulation 111 that builds up within the open spaces 107, the higher the capacitance should be across the corresponding adjacent disk blades 46.

It should be appreciated that, while only one sensing assembly 202 has been described herein with reference to determining plugging between adjacent disk blades 46 of a disk gang 44 of a tillage implement 10, multiple sensing assemblies 202 may be associated with a disk gang 44. In such instance, the capacitance between multiple pairs of adjacent disk blades 46 can be monitored, thereby allowing plugging to be detected at various locations across the gang. For instance, in one embodiment, any suitable number of sensing assemblies 202 may be provided in operative association with a disk gang 44 such that the capacitance between each pair of adjacent disk blades 46 can be monitored.

Figure 6:
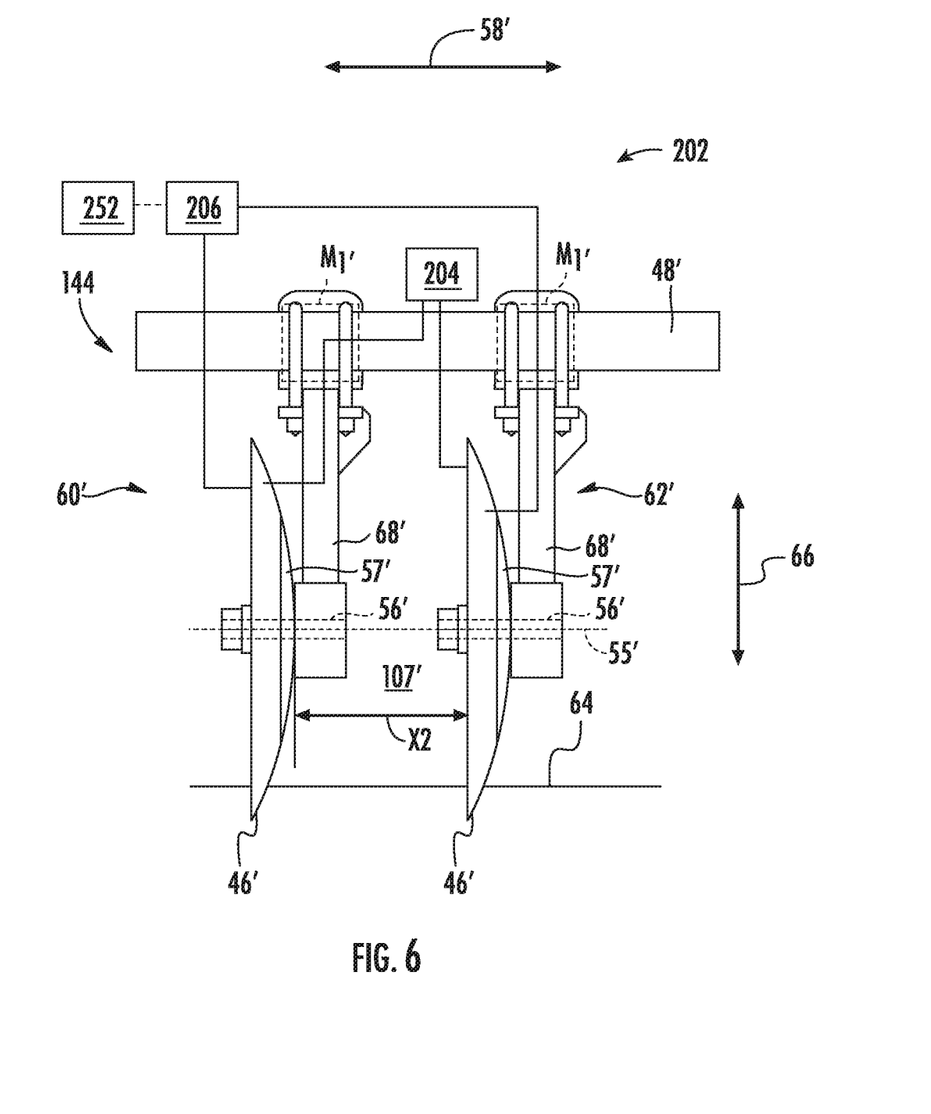
FIG. 6 illustrates a front view of another embodiment of a ground engaging assembly of an agricultural implement in accordance with aspects of the present subject matter, particularly illustrating one embodiment of a sensing assembly suitable for use in determining material accumulation relative to the ground engaging assembly.

It should further be appreciated that, while the sensing assembly 202 has generally been described herein with reference to determining plugging between adjacent disks 46 of a disk gang 44 of a tillage implement 10, the sensing assembly 202 may be configured to be associated with any other ground engaging tools or ground engaging assemblies of any suitable agricultural implement. For example, referring now to FIG. 6, an alternative embodiment of a ground engaging assembly with which the disclosed sensing assembly 202 may be used is illustrated in accordance with aspects of the present subject matter. Particularly, as shown in FIG. 6, the sensing assembly 202 may be suitable for use with a disk assembly 144, which is configured substantially similar to the disk gang 44 described above with reference to FIGS. 3-5, except that the disk blades 46' are individually mounted to a support arm 48'. Each disk blade 46' may be rotationally fixed to a respective rotational shaft 56' by a respective bearing 57'. Alternatively, in some embodiments, the disk blades 46' may be directly rotationally fixed to the respective rotational shaft 56'. The rotational shafts 56' are supported by respective hangers 68' coupled to the support arm 48'. The support arm 48' extends along an axial direction of the disk assembly 144 (e.g., as indicated by arrow 58') between a first end 60' and a second end 62'. The disk blades 46' are spaced apart in an axial direction 58' of the disk assembly 144 by a distance X2 such that an open space 107' is defined between each adjacent pair of disk blades 46'. The disk blades 46' are rotatable about a rotational axis 55' parallel to and extending along the axial direction 58', with the rotational axis 55' being defined by the shafts 56'.

A sensing assembly, such as the sensing assembly 202 described above, may be positioned relative to the disk assembly 144. Particularly, as described above, the sensing assembly 202 may include a power source 204 configured to supply a voltage across the adjacent disk blades 46'. For instance, the power source 204 may be configured as a battery, with a positive terminal connected to one of the disk blades 46' and a negative terminal connected to the other disk blade 46'.

Similar to the disk blades 46 described above, the disk blades 46' may be electrically isolated from each other by forming, coating, or otherwise processing at least one of the components coupled between the adjacent disk blades 46' with non-conductive material so that such component(s) is non-conductive. For example, at least one of the support arm 48', bearing(s) 57', or the hanger(s) 68' may be non-conductive. Additionally or alternatively, the disk blades 46' may be electrically isolated from each other by inserting a non-conductive material M1' between at least two of the components coupled between the disk blades 46'. For example, a non-conductive material M1' may be positioned between the support arm 48' and the hanger(s) 68' as shown in FIG. 6. While not shown, the non-conductive material M1' may alternatively or additionally be positioned between the disk blade(s) 46' and the respective bearing 57', such as between the disk blade(s) 46' and the respective shaft 56' or between the shaft(s) 56' and the respective bearing.

As described above, the sensing assembly 202 may further include a capacitance sensor 206 configured to detect the capacitance, or a parameter indicative of the capacitance, across the pair of adjacent disk blades 46'. For instance, as described above, the capacitance sensor 206 may be configured as a capacitance meter such that the capacitance sensor 206 directly measures the capacitance across the adjacent disk blades 46'. Alternatively, the capacitance sensor 206 may be configured to measure any other parameter indicative of capacitance, such as voltage, and/or the like. As such, the sensing assembly 202 may similarly be used to monitor the capacitance between or across the adjacent disk blades 46' as material accumulates between the disk blades 46', with the monitored capacitance being indicative of an amount and/or type of material accumulation between the disk blades 46'.

Figure 7:
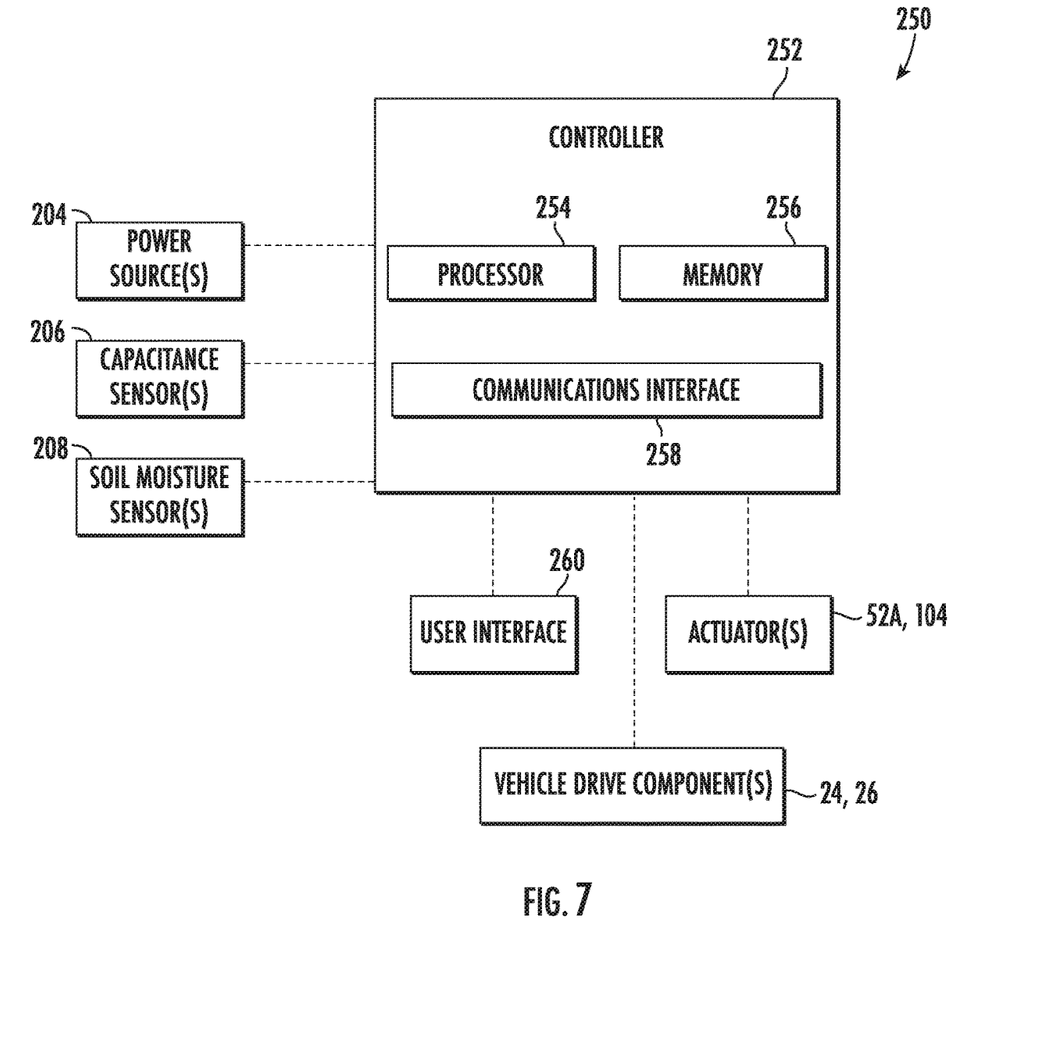
FIG. 7 illustrates a schematic view of one embodiment of a system for determining material accumulation relative to ground engaging tools of an agricultural implement in accordance with aspects of the present subject matter.

Referring now to FIG. 7, a schematic view of one embodiment of a system 250 for determining material accumulation relative to ground engaging tools of an agricultural implement is illustrated in accordance with aspects of the present subject matter. In general, the system 250 will be described herein with reference to the implement 10 described above with reference to FIGS. 1-2 and the sensing assembly 202 described above with reference to FIGS. 3-6. However, it should be appreciated by those of ordinary skill in the art that the disclosed system 250 may generally be utilized with agricultural implements having any other suitable implement configuration and/or with ground engaging assemblies/tools having any other suitable assembly/tool configuration.

As shown in FIG. 7, the system 250 may include a controller 252 configured to electronically control the operation of one or more components of the agricultural implement 10. In general, the controller 252 may comprise any suitable processor-based device known in the art, such as a computing device or any suitable combination of computing devices. Thus, in several embodiments, the controller 252 may include one or more processor(s) 254, and associated memory device(s) 256 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 256 of the controller 252 may generally comprise memory element(s) including, but not limited to, a computer readable medium (e.g., random access memory RAM)), a computer readable non-volatile medium (e.g., a flash memory), floppy disk, a compact disk-read only memory (CD-ROM), a magneto-optical disk (MOD), a digital versatile disk (DVD) and/or other suitable memory elements. Such memory device(s) 256 may generally be configured to store suitable computer-readable instructions that, when implemented by the processor(s) 254, configure the controller 252 to perform various computer-implemented functions, such as one or more aspects of the methods and algorithms that will be described herein. In addition, the controller 252 may also include various other suitable components, such as a communications circuit or module, one or more input/output channels, a data/control bus and/or the like.

It should be appreciated that, in several embodiments, the controller 252 may correspond to an existing controller of the agricultural implement 10 and/or of the work vehicle 12 to which the implement 10 is coupled. However, it should be appreciated that, in other embodiments, the controller 252 may instead correspond to a separate processing device. For instance, in one embodiment, the controller 252 may form all or part of a separate plug-in module that may be installed within the agricultural implement 10 to allow for the disclosed system and method to be implemented without requiring additional software to be uploaded onto existing control devices of the agricultural implement 10.

In some embodiments, the controller 252 may be configured to include a communications module or interface 258 to allow for the controller 252 to communicate with any of the various other system components described herein. For instance, as described above, the controller 252 may, in several embodiments, be configured to receive data inputs from one or more sensors of the agricultural implement 10 that are used to detect one or more parameters associated with material accumulation relative to the associated ground engaging assembly. Particularly, the controller 252 may be in communication with one or more sensors configured to detect parameters indicative of material accumulation between a pair of adjacent ground engaging tools of the associated ground engaging assembly. For instance, the controller 252 may be communicatively coupled to one or more capacitance sensors 206 and/or one or more soil moisture sensors 208 via any suitable connection, such as a wired or wireless connection, to allow data indicative of material accumulation between the adjacent ground engaging tools to be transmitted from the sensor(s) 206, 208 to the controller 252. Further, the controller 252 may, in some embodiments, be communicatively coupled to one or more power sources, such as the power source 204, via any suitable connection, such as a wired or wireless connection, to allow the controller 252 to regulate the supply of power output from the power source(s) 204.

Specifically, referring back to FIGS. 3-6, each sensing assembly 202 may, for example, include or be associated with one or more capacitance sensors 206 installed or otherwise positioned relative to a pair of adjacent ground engaging tools to capture data (e.g., capacitance data) indicative of the capacitance across the pair of adjacent ground engaging tools, which in turn, is indicative of material accumulation relative to the adjacent ground engaging tools (e.g., disk blades 46, 46', leveling disks 52, etc.) of the implement 10. Additionally, the implement 10 may be associated with one or more of soil moisture sensors 208 configured to detect the moisture content of the soil within the field at the location of the implement 10. Thus, in several embodiments, the controller 252 may be configured to determine the presence and/or amount of material accumulation relative to the adjacent ground engaging tools based on the data received from the sensor(s) 206, 208. For example, the controller 252 may include one or more suitable algorithms stored within its memory 256 that, when executed by the processor 254, allow the controller 252 to infer or estimate the presence and/or amount of material accumulation relative to the adjacent ground engaging tools based on the data received from the sensor(s) 206, 208.

For instance, the controller 252 may include one or more algorithms that compare the detected capacitance across the adjacent ground engaging tools to one or more capacitance thresholds associated with the presence of material accumulation. For example, the controller 252 may compare the capacitance across the adjacent ground engaging tools to at least one capacitance threshold corresponding to a severity of the material accumulation between the adjacent ground engaging tools. The capacitance threshold(s) may, in one embodiment, be selected based on the theoretical capacitance determined for the soil type and moisture content present within the field. The soil type may, in one embodiment, be input by an operator (e.g., via the user interface 260) or may be detected from data collected by one or more auxiliary sensors, such as images from one or more image-based sensors. Further, the moisture content may be measured by the soil moisture sensor(s) 208 as described above, or may be determined from historical soil moisture data stored in the memory 256 of the controller 252. It should be appreciated that, in other embodiments, the capacitance threshold(s) may be selected based on experimental results for different levels of plugging with the field materials present in the field.

In one embodiment, the capacitance threshold(s) may include a minimum capacitance threshold, which corresponds to the capacitance across the adjacent ground engaging tools when no soil or field materials are disposed between the adjacent ground engaging tools. In some embodiments, the capacitance threshold(s) may include an initial capacitance threshold, which corresponds to the capacitance across the adjacent ground engaging tools when the ground engaging tools first begin to move through the soil within the field, indicating a normal operating condition of the ground engaging tools. In one embodiment, the capacitance threshold(s) may include a plugging capacitance threshold, which corresponds to the capacitance across the adjacent ground engaging tools when excessive material accumulation has built up between the ground engaging tools. In further embodiments, the capacitance threshold(s) may include a maximum capacitance threshold, which corresponds to the capacitance across the adjacent ground engaging tools when an entirety of the space between the adjacent ground engaging tools is plugged with field materials.

Based on the comparison of the measured capacitance to the capacitance threshold(s), the presence of material accumulation between the adjacent ground engaging tools may be determined. Moreover, the capacitance threshold(s) may also be used to determine when plugging is occurring between the adjacent ground engaging tools. For instance, the controller 252 may determine the presence of a plugged condition when the measured capacitance across the adjacent ground engaging tools is significantly greater than the minimum or initial capacitance threshold(s) is greater than the plugging capacitance threshold and/or reaches the maximum capacitance threshold. Similarly, the controller 252 may determine that there is no significant material accumulation (if any) between the adjacent ground engaging tools when the measured capacitance across the adjacent ground engaging tools is less than the plugging capacitance threshold. The controller 252 may further determine the percentage or severity of plugging between the adjacent ground engaging tools based on the comparison of the measured capacitance to the capacitance threshold(s). For instance, the maximum capacitance threshold may indicate a capacitance measured when all of the space between the adjacent ground engaging tools is filled with material accumulation. As such, the ratio of the measured capacitance to the maximum capacitance threshold may generally indicate the percentage or amount of plugging between the adjacent ground engaging tools.

The controller 252 may further confirm or determine the existence of a plugged condition by monitoring a frequency or a period at which the material accumulation is detected. For instance, the controller 252 may compare the frequency or the period at which the excessive material accumulation is detected to a frequency threshold or a period threshold corresponding to a persistence of the material accumulation between the ground engaging tools, and/or the like. The controller 252 may determine that a plugged condition exists when the detected capacitance is above the capacitance threshold(s) more frequently than the frequency threshold or for periods longer than the period threshold. The controller 252 may further use a combination of such thresholds to further verify the likelihood of plugging.

The controller may further be configured to perform one or more implement-related control actions based on the data received from the sensor(s) 206, 208. Specifically, the controller 252 may be configured to control one or more components of the agricultural implement 10 on the determination of the presence of excessive material accumulation or a plugging condition relative to adjacent ground engaging tools. For example, as shown in FIG. 7, the controller 252 may be configured to control the disk gang actuator(s) 104 associated with the disk gang 44. For instance, the controller 252 may be configured to control the down force on the disk gang 44 to adjust a penetration depth of the disk blades 46 of the disk gang 44 to help reduce the amount of material accumulation formed relative to the disk blades 46. Similarly, the controller 252 may be configured to control the leveling disk actuator(s) 52A. For instance, the controller 252 may be configured to adjust a down force on the leveling disks 52 to adjust a penetration depth of the leveling disks 52 to help reduce the amount of material accumulation formed relative to the leveling disks 52.

Further, in some embodiments, the controller 252 may be configured to indicate to an operator the presence of material accumulation and/or one or more parameters associated with the material accumulation determined relative to the ground engaging tools. For example, in the embodiment shown in FIG. 7, the communications module 258 may allow the controller 252 to communicate with a user interface 260 having a display device configured to display information regarding the presence of material accumulation (e.g., amount, frequency, duration, patterns, and/or the like) determined relative to the around engaging tools. However, it should be appreciated that the controller 252 may instead be communicatively coupled to any number of other indicators, such as lights, alarms, and/or the like to provide an indicator to the operator regarding the presence of material accumulation relative to pairs of ground engaging tools.

Additionally or alternatively, in some embodiments, the controller 252 may be configured to perform one or more vehicle-related control actions based on the determination of a plugging condition relative to the ground engaging tools. For example, as shown in FIG. 7, in some embodiments, the controller 252 may be configured to control the operation of one or more vehicle drive components configured to drive the vehicle 12 coupled to the implement 10, such as the engine 24 and/or the transmission 26 of the vehicle 12. In such embodiments, the controller 252 may be configured to control the operation of the vehicle drive component(s) 24, 26 based on the determination of the material accumulation, for example, to slow down the vehicle and implement 10 or bring the vehicle and implement 10 to a stop when it is determined that the material accumulation is excessive.

It should be appreciated that, depending on the type of controller 252 being used, the above-described control actions may be executed directly by the controller 252 or indirectly via communications with a separate controller.

For instance, when the controller 252 corresponds to an implement controller of the implement 10, the controller 252 may be configured to execute the implement-related control actions directly while being configured to execute the vehicle-related control actions by transmitting suitable instructions or requests to a vehicle-based controller of the vehicle 12 towing the implement 10 (e.g., using an ISObus communications protocol). Similarly, when the controller 252 corresponds to a vehicle controller of the vehicle towing the implement 10, the controller 252 may be configured to execute the vehicle-related control actions directly while being configured to execute the implement-related control actions by transmitting suitable instructions or requests to an implement-based controller of the implement 10 (e.g., using an ISObus communications protocol). In other embodiments, the controller 252 may be configured to execute both the implement-based control actions and the vehicle-based control actions directly or the controller 252 may be configured to execute both of such control action types indirectly via communications with a separate controller.

Figure 8:
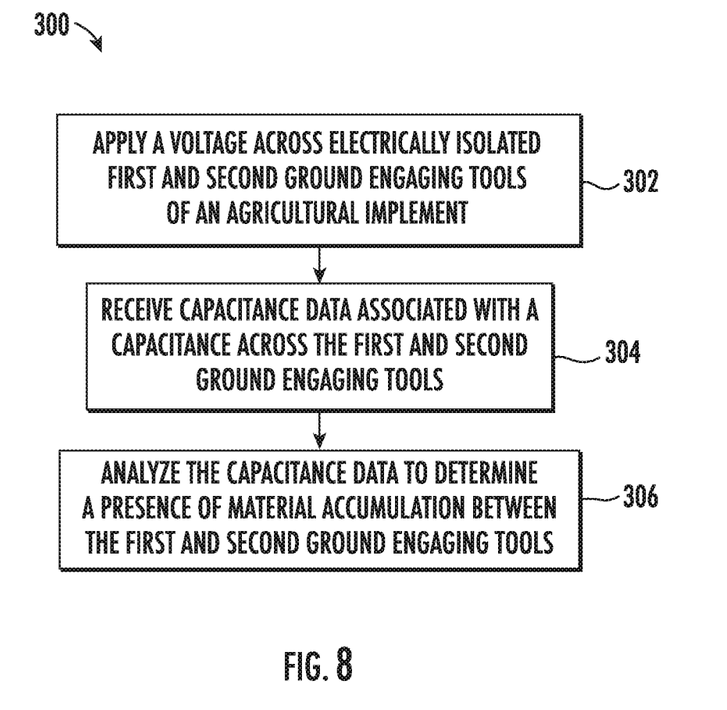
FIG. 8 illustrates a method for determining material accumulation relative to ground engaging tools of an agricultural implement in accordance with aspects of the present subject matter.

Referring now to FIG. 8, a flow diagram of one embodiment of a method 300 for determining material accumulation relative to ground engaging tools of an agricultural implement is illustrated in accordance with aspects of the present subject matter. In general, the method 300 will be described herein with reference to the implement 10 and the work vehicle 12 shown in FIGS. 1 and 2, the sensing assembly 202 shown in FIGS. 3-6, as well as the various system components shown in FIG. 7. However, it should be appreciated that the disclosed method 300 may be implemented with work vehicles and/or implements having any other suitable configurations and/or within systems having any other suitable system configuration. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the method disclosed herein can be omitted, rearranged, combined, and/or adapted in various ways without deviating from the scope of the present disclosure.

As shown in FIG. 8, at (302), the method 300 may include applying a voltage across electrically isolated first and second ground engaging tools of an agricultural implement. For instance, as indicated above, the power source 204 may supply a voltage across adjacent ground engaging tools, with the adjacent ground engaging tools (e.g., disk blades 46, 46', leveling disks 52) being electrically isolated from each other. For example, one or more components connected between the adjacent ground engaging tools may be formed from non-conductive material or a non-conductive material M1, M1' may be inserted between two or more components connected between the adjacent ground engaging tools to electrically isolate the ground engaging tools.

Further, as shown at (304), the method 300 may include receiving capacitance data associated with a capacitance across the first and second ground engaging tools. For example, as described above, the controller 252 may receive capacitance data from a capacitance sensor 206 corresponding to the capacitance between the first and second ground engaging tools.

Additionally, as shown at (306), the method 300 may include analyzing the capacitance data to determine a presence of material accumulation between the first and second ground engaging tools. For instance, as indicated above, the controller 252 may compare the capacitance data to one or more capacitance thresholds to determine the presence of material accumulation between the adjacent ground engaging tools. For example, as described above, the controller 252 may identify the presence of material accumulation between adjacent ground engaging tools by determining when the measured capacitance between the adjacent ground engaging tools exceeds a plugging capacitance threshold, when the frequency of determining material accumulation exceeds a frequency threshold, and/or when the duration of the material accumulation exceeds a period threshold.

It is to be understood that the steps of the method 300 are performed by the controller 252 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the controller 252 described herein, such as the method 300, is implemented in software code or instructions which are tangibly stored on a tangible computer readable medium. The controller 252 loads the software code or instructions via a direct interface with the computer readable medium or via a wired and/or wireless network. Upon loading and executing such software code or instructions by the controller 252, the controller 252 may perform any of the functionality of the controller 252 described herein, including any steps of the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for determining material accumulation relative to ground engaging tools of an agricultural implement, the system comprising:

a frame member;

first and second ground engaging tools coupled to the frame member, the first and second ground engaging tools being configured to engage soil within a field as the agricultural implement is moved across the field, the first and second ground engaging tools being electrically isolated from each other;

a power source configured to apply a voltage across the first and second ground engaging tools such that the first and second ground engaging tools together form a parallel-plate capacitor;

a sensor coupled to the first and second ground engaging tools, the sensor being configured to measure a capacitance across the parallel-plate capacitor; and a controller communicatively coupled to the sensor, the controller configured to determine a presence of material accumulation between the first and second ground engaging tools based at least in part on the measured capacitance.

2. The system of claim 1, wherein the controller is configured to determine the presence of material accumulation by comparing the measured capacitance to at least one capacitance threshold.

3. The system of claim 2, wherein the at least one capacitance threshold is determined based at least in part on a moisture content of soil within the field.

4. The system of claim 2, wherein the at least one capacitance threshold comprises one or more of a minimum capacitance threshold, an initial capacitance threshold, a plugged capacitance threshold, or a maximum capacitance threshold.

5. The system of claim 1, wherein the controller is further configured to initiate a control action based at least in part on the determination of the presence of the material accumulation.

6. The system of claim 1, wherein the first and second ground engaging tools comprise first and second disks, respectively.

7. The system of claim 1, wherein the first and second ground engaging tools are coupled to a rotational shaft, and wherein the first and second ground engaging tools are electrically isolated from each other by at least one of: the rotational shaft being non-conductive; or at least one non-conductive element being positioned between the rotational shaft and at least one of the first ground engaging tool or the second ground engaging tool.

8. The system of claim 1, wherein the first and second ground engaging tools are electrically isolated from each other by at least one of: the frame member being non-conductive or at least one non-conductive element being positioned between the frame member and at least one of the first ground engaging tool or the second ground engaging tool.

9. An agricultural implement, comprising:
a frame member;
a plurality of disks supported on the frame member, first and second disks of the plurality of disks being electrically isolated from each other;
a power source configured to apply a voltage across the first and second disks such that the first and second disks together form a parallel-plate capacitor;
a sensor coupled to the first and second disks, the sensor being configured to measure a capacitance across the parallel-plate capacitor; and
a controller communicatively coupled to the sensor, the controller configured to determine a presence of material accumulation between the first and second disks based at least in part on the measured capacitance.

10. The implement of claim 9, wherein the first and second disks are coupled to a rotational shaft, wherein the first and second disks are electrically isolated from each other by at least one of: the rotational shaft being non-conductive; or at least one non-conductive element being positioned between the rotational shaft and at least one of the first and second disks.

11. The implement of claim 9, wherein the first and second disks are electrically isolated from each other by at least one of: the frame member being non-conductive or at least one non-conductive element being positioned between the frame member and at least one of the first disk or the second disk.

12. A method for determining material accumulation relative to ground engaging tools of an agricultural implement, the agricultural comprising a frame member and first and second ground engaging tools coupled to the frame member, the method comprising:
applying a voltage across the first and second ground engaging tools, the first and second ground engaging tools being electrically isolated from each other, such that the first and second ground engaging tools together form a parallel-plate capacitor;
receiving, with a computing device, capacitance data associated with a capacitance across the parallel-plate capacitor, the capacitance data being generated by a sensor coupled to the first and second ground engaging tools; and
analyzing, with the computing device, the capacitance data to determine a presence of material accumulation between the first and second ground engaging tools.

13. The method of claim 12, wherein analyzing the capacitance data comprises comparing the capacitance across the first and second ground engaging tools to at least one capacitance threshold associated with the presence of material accumulation.

14. The method of claim 13, wherein the at least one capacitance threshold is determined based at least in part on a moisture content of soil within a field.

15. The method of claim 12, further comprising initiating, with the computing device, a control action based at least in part on the determination of the presence of the material accumulation.

16. The method of claim 15, wherein the control action comprises adjusting a downforce applied to the first and second ground engaging tools.

17. The method of claim 15, wherein the control action comprises notifying an operator of the agricultural implement of the presence of material accumulation between the first and second ground engaging tools.

18. The method of claim 12, wherein the first and second ground engaging tools are coupled to a rotational shaft, and wherein the first and second ground engaging tools are electrically isolated from each other by at least one of: the rotational shaft being non-conductive; or at least one non-conductive element being positioned between the rotational shaft and at least one of the first ground engaging tool or the second ground engaging tool.

19. The method of claim 12, wherein the first and second ground engaging tools are electrically isolated from each other by at least one of: the frame member being non-conductive or at least one non-conductive element being positioned between the frame member and at least one of the first ground engaging tool or the second ground engaging tool.

20. The method of claim 12, wherein the first and second ground engaging tools comprise first and second disks, respectively.

* * * * *